(12) United States Patent
Raman et al.

(10) Patent No.: US 8,879,549 B2
(45) Date of Patent: Nov. 4, 2014

(54) CLEARING FORWARDING ENTRIES DYNAMICALLY AND ENSURING CONSISTENCY OF TABLES ACROSS ETHERNET FABRIC SWITCH

(75) Inventors: Mythilikanth Raman, San Jose, CA (US); Mary Manohar, Santa Clara, CA (US); Wei-Chiuan Chen, San Jose, CA (US); Gangadhar Vegesana, Milpitas, CA (US); Vardarajan Venkatesh, Santa Clara, CA (US); Raju Shekarappa, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 27 days.

(21) Appl. No.: 13/365,808

(22) Filed: Feb. 3, 2012

(65) Prior Publication Data

US 2013/0003729 A1    Jan. 3, 2013

Related U.S. Application Data

(60) Provisional application No. 61/502,136, filed on Jun. 28, 2011.

(51) Int. Cl.
*H04L 12/28* (2006.01)

(52) U.S. Cl.
USPC ............................. 370/389; 370/401

(58) Field of Classification Search
CPC ..... H04L 12/56; H04L 2012/56; H04L 12/66; H04L 12/46; H04L 2012/46; H04L 2012/5618; H04L 45/02; H04L 45/04; H04L 45/10

USPC .......................................... 370/389, 400, 401
See application file for complete search history.

(56) References Cited

U.S. PATENT DOCUMENTS

| | | | |
|---|---|---|---|
| 5,390,173 | A | 2/1995 | Spinney |
| 5,802,278 | A | 9/1998 | Isfeld |
| 5,983,278 | A | 11/1999 | Chong |
| 6,041,042 | A | 3/2000 | Bussiere |
| 6,085,238 | A | 7/2000 | Yuasa |
| 6,104,696 | A | 8/2000 | Kadambi |

(Continued)

FOREIGN PATENT DOCUMENTS

| | | |
|---|---|---|
| CN | 102801599 A | 11/2012 |
| EP | 1916807 A2 | 4/2008 |
| EP | 2001167 A1 | 12/2008 |
| WO | 2010111142 A1 | 9/2010 |

OTHER PUBLICATIONS

"Switched Virtual Internetworking moved beyond bridges and routers", 8178 Data Communications Sep. 23, 1994, No. 12, New York.

(Continued)

*Primary Examiner* — Hong Cho
(74) *Attorney, Agent, or Firm* — Shun Yao; Park, Vaughan, Fleming & Dowler LLP

(57) ABSTRACT

One embodiment of the present invention provides a switch. The switch includes an ownership management mechanism and a notification mechanism. The ownership management mechanism maintains a local ownership association between the switch, and a medium access control (MAC) address learned at the switch and terminates the local ownership association for the MAC address. The notification mechanism generates a first notification indicating the local ownership association and a second notification indicating the termination of the local ownership association.

24 Claims, 9 Drawing Sheets

(56) References Cited

U.S. PATENT DOCUMENTS

| | | |
|---|---|---|
| 6,185,241 B1 | 2/2001 | Sun |
| 6,438,106 B1 | 8/2002 | Pillar |
| 6,542,266 B1 | 4/2003 | Phillips |
| 6,633,761 B1 | 10/2003 | Singhal |
| 6,873,602 B1 | 3/2005 | Ambe |
| 6,975,581 B1 | 12/2005 | Medina |
| 6,975,864 B2 | 12/2005 | Singhal |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2* | 3/2009 | Ge et al. .................. 370/229 |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,960 B1 | 3/2010 | Aubuchon |
| 7,690,040 B2 | 3/2010 | Frattura |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shikla |
| 8,078,704 B2 | 12/2011 | Lee |
| 8,102,781 B2 | 1/2012 | Smith |
| 8,116,307 B1 | 2/2012 | Thesayi |
| 8,134,922 B2 | 3/2012 | Elangovan |
| 8,155,150 B1* | 4/2012 | Chung et al. ............... 370/475 |
| 8,160,063 B2 | 4/2012 | Maltz |
| 8,160,080 B1* | 4/2012 | Arad et al. ................. 370/401 |
| 8,170,038 B2 | 5/2012 | Belanger |
| 8,194,674 B1 | 6/2012 | Pagel |
| 8,195,774 B2 | 6/2012 | Lambeth |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,270,401 B1 | 9/2012 | Barnes |
| 8,295,291 B1 | 10/2012 | Ramanathan |
| 8,301,686 B1 | 10/2012 | Appajodu |
| 8,351,352 B1 | 1/2013 | Eastlake, III |
| 8,369,347 B2 | 2/2013 | Xiong |
| 8,392,496 B2 | 3/2013 | Linden |
| 8,462,774 B2* | 6/2013 | Page et al. ................. 370/369 |
| 8,520,595 B2 | 8/2013 | Yadav |
| 8,599,850 B2 | 12/2013 | Jha |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0117508 A1 | 6/2004 | Shimizu |
| 2004/0120326 A1 | 6/2004 | Yoon |
| 2004/0165595 A1 | 8/2004 | Holmgren |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0169188 A1 | 8/2005 | Cometto |
| 2005/0195813 A1 | 9/2005 | Ambe |
| 2005/0213561 A1 | 9/2005 | Yao |
| 2005/0265356 A1 | 12/2005 | Kawarai |
| 2005/0278565 A1 | 12/2005 | Frattura |
| 2006/0018302 A1 | 1/2006 | Ivaldi |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2007/0036178 A1 | 2/2007 | Hares |
| 2007/0097968 A1 | 5/2007 | Du |
| 2007/0116224 A1 | 5/2007 | Burke |
| 2007/0177597 A1 | 8/2007 | Ju |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0186981 A1 | 8/2008 | Seto |
| 2008/0205377 A1 | 8/2008 | Chao |
| 2008/0219172 A1 | 9/2008 | Mohan |
| 2008/0225853 A1 | 9/2008 | Melman |
| 2008/0240129 A1 | 10/2008 | Elmeleegy |
| 2008/0267179 A1 | 10/2008 | LaVigne |
| 2008/0285555 A1 | 11/2008 | Ogasahara |
| 2008/0298248 A1 | 12/2008 | Roeck |
| 2009/0037607 A1 | 2/2009 | Farinacci |
| 2009/0044270 A1 | 2/2009 | Shelly |
| 2009/0067422 A1 | 3/2009 | Poppe |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0138752 A1 | 5/2009 | Graham |
| 2009/0199177 A1 | 8/2009 | Edwards |
| 2009/0204965 A1 | 8/2009 | Tanaka |
| 2009/0222879 A1 | 9/2009 | Kostal |
| 2009/0245242 A1 | 10/2009 | Carlson |
| 2009/0260083 A1 | 10/2009 | Szeto |
| 2009/0323708 A1 | 12/2009 | Ihle |
| 2009/0327392 A1 | 12/2009 | Tripathi |
| 2009/0327462 A1 | 12/2009 | Adams |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0169467 A1 | 7/2010 | Shukla |
| 2010/0169948 A1 | 7/2010 | Budko |
| 2010/0226381 A1 | 9/2010 | Mehta |
| 2010/0246388 A1* | 9/2010 | Gupta et al. ................. 370/225 |

(56) References Cited

U.S. PATENT DOCUMENTS

| | | |
|---|---|---|
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2011/0019678 A1 | 1/2011 | Mehta |
| 2011/0035498 A1 | 2/2011 | Shah |
| 2011/0044339 A1 | 2/2011 | Kotalwar |
| 2011/0064086 A1 | 3/2011 | Xiong |
| 2011/0072208 A1 | 3/2011 | Gulati |
| 2011/0085560 A1 | 4/2011 | Chawla |
| 2011/0085563 A1 | 4/2011 | Kotha |
| 2011/0134802 A1 | 6/2011 | Rajagopalan |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161695 A1 | 6/2011 | Okita |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0274114 A1 | 11/2011 | Dhar |
| 2011/0286457 A1 | 11/2011 | Ee |
| 2011/0296052 A1 | 12/2011 | Guo |
| 2011/0299391 A1 | 12/2011 | Vobbilisetty |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299536 A1 | 12/2011 | Cheng |
| 2012/0011240 A1 | 1/2012 | Hara |
| 2012/0014261 A1 | 1/2012 | Salam |
| 2012/0014387 A1 | 1/2012 | Dunbar |
| 2012/0027017 A1 | 2/2012 | Rai |
| 2012/0033663 A1 | 2/2012 | Guichard |
| 2012/0033665 A1* | 2/2012 | Jacob Da Silva et al. .... 370/389 |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0163164 A1 | 6/2012 | Terry |
| 2012/0177039 A1 | 7/2012 | Berman |
| 2012/0243539 A1 | 9/2012 | Keesara |
| 2012/0294192 A1 | 11/2012 | Masood |
| 2012/0320800 A1 | 12/2012 | Kamble |
| 2013/0034015 A1 | 2/2013 | Jaiswal |
| 2013/0067466 A1 | 3/2013 | Combs |
| 2013/0259037 A1 | 10/2013 | Natarajan |
| 2014/0105034 A1 | 4/2014 | Sun |

OTHER PUBLICATIONS

S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Brocade Fabric OS (FOS) 6.2 Virtual Fabrics Feature Frequently Asked Questions, Mar. 2013.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
"Switched Virtual Internetworking moves beyond bridges and routers", Sep. 23, 1994, No. 12, New York, US.
Knight, S. et al. "Virtual Router Redundancy Protocol", Apr. 1998, XP-002135272.
Eastlake, Donald et al., "RBridges: TRILL Header Options", Dec. 2009.
Touch, J. et al., "Transparent Interconnection of Lots of Links (TRILL): Problem and Applicability Statement", May 2009.
Perlman, Radia et al., "RBridge VLAN Mapping", Dec. 2009.
"Brocade Fabric OS (FOS) 6.2 Virtual Fabrics Feature Frequently Asked Questions" Mar. 2013.
Perlman, Radia "Challenges and Opportunities in the Design of TRILL: Routed layer 2 Technology", XP-002649647, 2009.
Perlman, Radia et al., "RBridges: Base Protocol Specification", Mar. 2010.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 13, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 131/098,490 Office Action dated Jul. 9, 2013.
U.S. Appl. No. 13/087,239 Office Action dated May 22, 2013.
U.S. Appl. No. 13/087,239 Office Action dated Dec. 15, 2012.
U.S. Appl. No. 12/725,249 Office Action dated Apr. 26, 2013.
U.S. Appl. No. 12/725,249 Office Action dated Sep. 12, 2012.
Brocade Unveils "The Effortless Network", http://newsroom.brocade.com/press-releases/brocade-unveils-the-effortless-network--nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.

(56) References Cited

OTHER PUBLICATIONS

FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, "Problem Statement: Overlays for Network Virtualization draft-narten-nvo3-overlay-problem-statement-01", Oct. 31, 2011.
Knight, "Layer 2 and 3 Virtual Private Networks: Taxonomy, Technology, and Standardization Efforts", Jun. 2004.
Brocade "An Introduction to Brocade VCS Fabric Technology", Dec. 3, 2012.
Kreeger, "Network Virtualization Overlay Control Protocol Requirements draft-kreeger-nvo3-overlay-cp-00", Jan. 30, 2012.
Knight, "Network Based IP VPN Architecture using Virtual Routers", May 2003.
Louati, "Network-Based Virtual Personal Overlay Networks Using Programmable Virtual Routers", Jul. 2005.
Office Action for U.S. Appl. No. 13/533,843, filed Jun. 26, 2012, dated Oct. 21, 2013.
Office Action for U.S. Appl. No. 13/044,326, filed Mar. 9, 2011, dated Oct. 2, 2013.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/092,877, filed Apr. 22, 2011, dated Sep. 5, 2013.
Office Action for U.S. Appl. No. 13/092,877, filed Apr. 22, 2011, dated Jan. 6, 2014.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jun. 6, 2014.
Office Action for U.S. Appl. No. 13/533,843, filed Jun. 26, 2012, dated May 14, 2014.
Office Action for U.S. Appl. No. 13/484,072, filed May 30, 2012, dated May 9, 2014.
Office Action for U.S. Appl. No. 13/351,513, filed Jan. 17, 2012, dated Feb. 28, 2014.
Office Action for U.S. Appl. No. 13/425,238, filed Mar. 20, 2012, dated Mar. 6, 2014.
Office Action for U.S. Appl. No. 13/030,806, filed Feb. 18, 2011, dated Apr. 22, 2014.
Office Action for U.S. Appl. No. 13/092,752, filed Apr. 22, 2011, dated Apr. 9, 2014.
Office Action for U.S. Appl. No. 13/092,701, filed Apr. 22, 2011, dated Mar. 26, 2014.
Office Action for U.S. Appl. No. 13/092,460, filed Apr. 22, 2011, dated Mar. 14, 2014.
Office Action for U.S. Appl. No. 13/092,724, filed Apr. 22, 2011, dated Apr. 9, 2014.
Office Action for U.S. Appl. No. 13/098,490, filed May 2, 2011, dated Mar. 27, 2014.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Apr. 22, 2014, U.S. Appl. No. 13/030,806, filed Feb. 18, 2011.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.

* cited by examiner

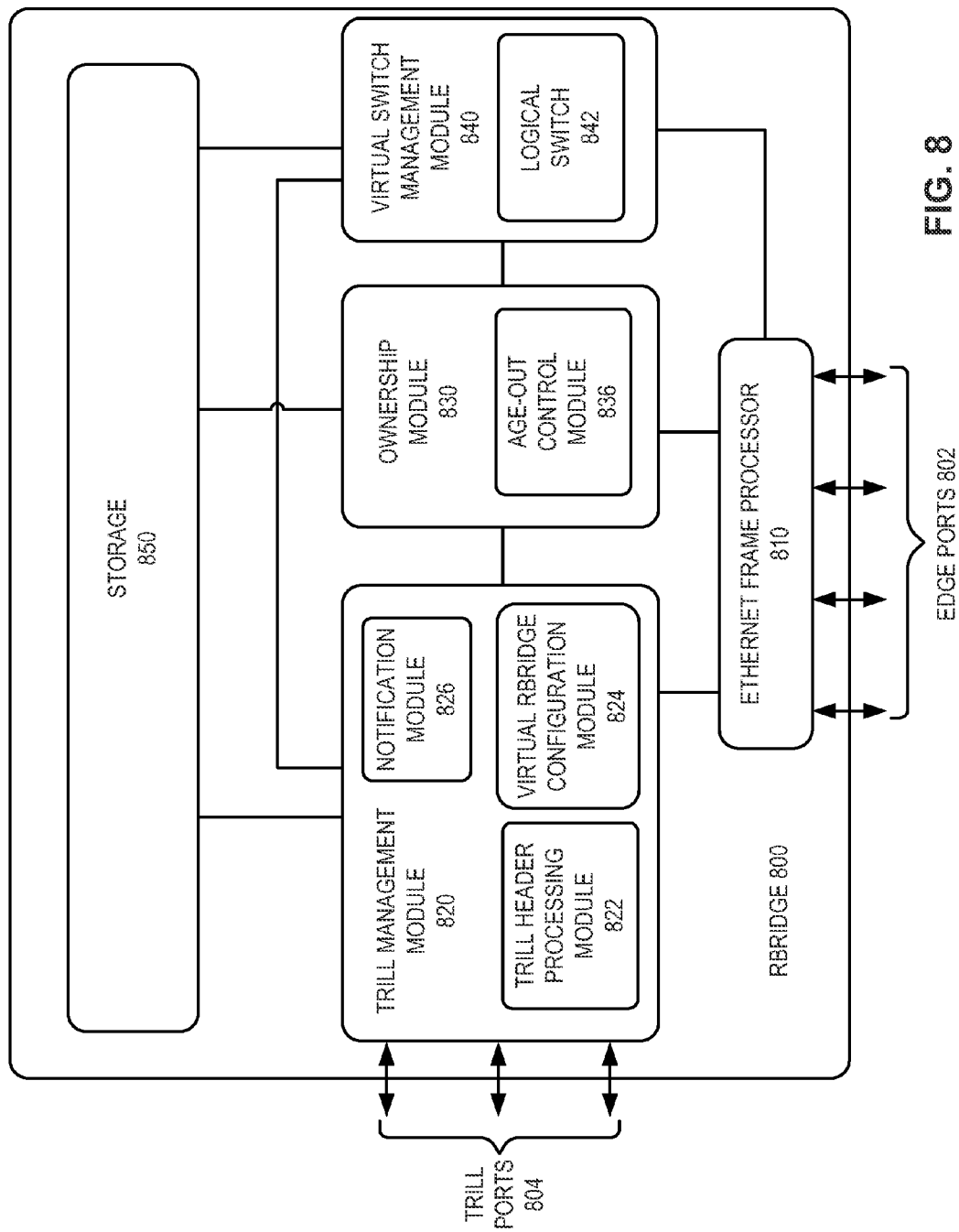

CLEARING FORWARDING ENTRIES DYNAMICALLY AND ENSURING CONSISTENCY OF TABLES ACROSS ETHERNET FABRIC SWITCH

RELATED APPLICATIONS

This application claims the benefit of U.S. Provisional Application No. 61/502,136, titled "Clearing Forwarding Entries Dynamically and Ensuring Consistency of Tables Across VCS with VLAGs," by inventors Mythilikanth Raman, Mary Manohar, Wei-Chivan Chen, Gangadhar Vegesana, Venky Venkatesh, and Raju Shekarappa, filed 28 Jun. 2011, which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and U.S. patent application Ser. No. 12/725,249, titled "Redundant Host Connection in a Routed Network," by inventors Somesh Gupta, Anoop Ghawani, Phanidhar Koganti, and Shunjia Yu, filed 16 Mar. 2010, the disclosures of which are incorporated by reference herein.

BACKGROUND

1. Field

The present disclosure relates to network management. More specifically, the present disclosure relates to a method and system for distributed management of layer-2 address table entries.

2. Related Art

The growth of the Internet has brought with it an increasing demand for bandwidth. As a result, equipment vendors race to build larger and faster networks with large number of switches, each capable of supporting a large number of end devices, to move more traffic efficiently. However, managing the forwarding entries associated with these end devices becomes complex when the forwarding information is distributed across the switches. Particularly, due to distributed forwarding table updates, it is essential to maintain consistency across a network.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when a distributed yet consistent mechanism to clear entries from a layer-2 address table is desired.

SUMMARY

One embodiment of the present invention provides a switch. The switch includes an ownership management mechanism and a notification mechanism. The ownership management mechanism maintains a local ownership association between the switch and a medium access control (MAC) address learned at the switch, and terminates the local ownership association for the MAC address. The notification mechanism generates a first notification indicating the local ownership association and a second notification indicating the termination of the local ownership association.

In a variation on this embodiment, the second notification includes a first tier message indicating initiation of the termination and a second tier message indicating the termination of specific ownership association with the switch.

In a variation on this embodiment, the switch is a TRILL RBridge.

In a variation on this embodiment, the ownership association is indicated by a bit in a bitmap, and wherein the bit is associated with the switch.

In a variation on this embodiment, the ownership mechanism also terminates an ownership association for a MAC address learned at a remote switch, in response to receiving a notification from the remote switch.

In a variation on this embodiment, the switch is part of a link aggregation. The switch also includes an age-out control mechanism that creates an age-out indication for the switch and a MAC address learned at the switch, in response to inactivity from the MAC address over a period of time. The notification mechanism also generates a third notification associated with the age-out indication.

In a further variation on this embodiment, the age-out control mechanism also suppresses local age-out notifications for the MAC address in response to creating the age-out indication.

BRIEF DESCRIPTION OF THE FIGURES

FIG. 8 illustrates an exemplary architecture of a switch with distributed forwarding table update capability, in accordance with an embodiment of the present invention.

DETAILED DESCRIPTION

Figure 1A:
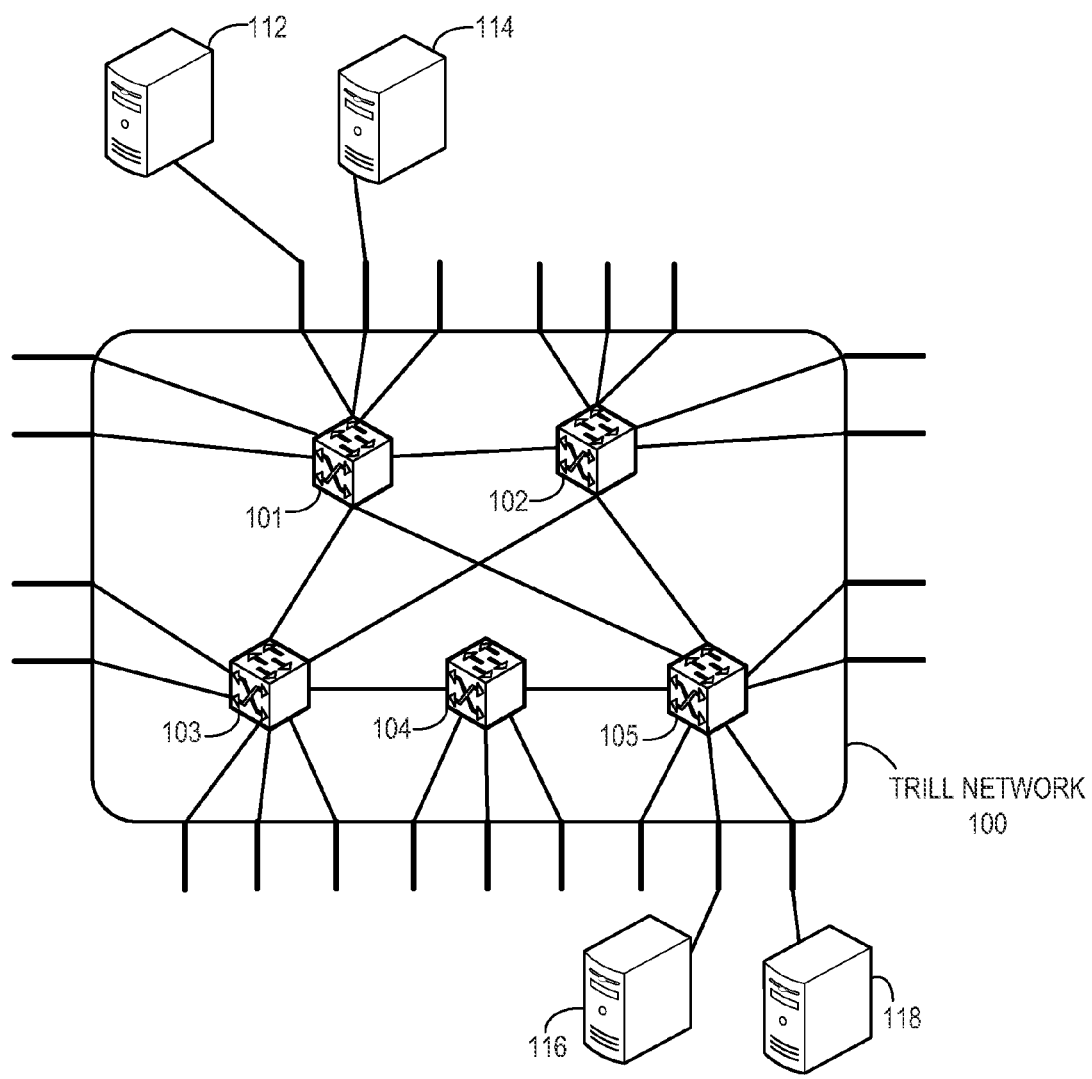
FIG. 1A illustrates an exemplary TRILL network with distributed forwarding information, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of consistently updating an entry in a distributed forwarding table is solved by providing ownership association to the entry. A TRILL RBridge may learn a MAC address of an end device coupled to a remote RBridge in the network and store the address in a forwarding table. In some embodiments, an RBridge may learn several thousand of such MAC addresses from a remote RBridge and save them in a local forwarding table. This can be viewed as distributed learning of forwarding information, such as MAC addresses. As the number of MAC addresses learned from a remote RBridge can be large, there can be a scenario where the addresses are removed from the remote RBridge while some of the addresses remain in the local forwarding table. For example, if all entries associated with the remote RBridge are removed (in some embodiments, this can be done from an external command to the RBridge), the local RBridge gets an instruction to remove the associated entries. However, if the instruction is received while the RBridge is still learning, then already added entries are deleted while the subsequent learned entries are stored. This leads to an inconsistency in forwarding tables of the local and the remote RBridges during the distributed learning process. Hence, it is essential to establish an ownership association and a two-tier clearing mechanism to ensure that the forwarding tables on RBridges across a TRILL network are consistent.

In some embodiments, the ownership association is implemented by associating a bitmap with each forwarding entry, wherein each bit represents an ownership association between the entry and an RBridge. Hence, the length of the bitmap should be at least the number of RBridges in the TRILL network. For example, a TRILL network with 5 RBridges should have a 5-bit bitmap for each forwarding entry, wherein each bit represents the ownership of the entry. If the end device corresponding to the entry is coupled to the second RBridge of the TRILL network, then the second bit of the bitmap should be set. In this way, an entry in the forwarding table is removed only when the owner RBridge clears the ownership bit. Consequently, an entry associated with a bitmap with all bits cleared can be removed from all RBridges in the network. In some embodiments, the length of the bitmap is predetermined and can be longer than the number of RBridges in the TRILL network, wherein the extra bits remain cleared.

Furthermore, if an RBridge issues a command to clear all forwarding entries, then the command is propagated to all other RBridges. Individual RBridges terminate their respective the ownership associations and issue a second clear command indicating the termination of ownerships. This second clear command from an issuing RBridge is also propagated to other RBridges. Upon receiving the second clear command, other RBridges clear the forwarding entries associated with the issuing RBridge. As a result, only when the owner of an entry issues a clear command is the entry cleared. This combination of ownership associations and a two-tier clearing mechanism ensures consistency across all forwarding tables in a TRILL network.

Another important aspect of maintaining consistency in distributed learning is the aging-out process of an entry. If any MAC address learned at an RBridge remains inactive over a period of time, the MAC address is considered aged out and is removed from local forwarding tables. In a TRILL network, an end device can be connected to a plurality of RBridges. Under such a scenario, the RBridges can form a virtual link aggregation that puts all links to the end device from all associated RBridges in a "trunked" mode. These physical RBridges participating in the link aggregation can be considered as partner RBridges. This link aggregation allows data to be sent to the end device via any of the partner RBridges. Consequently, in a link aggregation, a MAC address entry can be owned by multiple RBridges. Though the entry is owned by multiple RBridges, actual traffic may travel through only one RBridge. As a result, the MAC address may remain active in one of the partner RBridge while age out in the others. As the MAC address is associated with a link aggregation, the address entry should age out only when it ages out at all partner RBridges. In some embodiments of the present invention, an age-out indication is created for a respective MAC address learned from a link aggregation, wherein the indication specifies whether the MAC address is aged out at an RBridge. When the indication specifies aging out at all partner RBridges, then the MAC address can be aged out at all partner RBridges. In some embodiments, one RBridge among the partner RBridges is elected as the "master" RBridge and is responsible for notifying all partner RBridges when the MAC address is ready to be aged out.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "edge port" refers to a port which sends/receives data frames in native Ethernet format. The term "TRILL port" refers to a port which sends/receives data frames encapsulated with a TRILL header and outer MAC header.

The term "end device" refers to a network device that is typically not TRILL-capable. "End device" is a relative term with respect to the TRILL network. However, "end device" does not necessarily mean that the network device is an end host. An end device can be a host, a conventional layer-2 switch, or any other type of network device. Additionally, an end device can be coupled to other switches or hosts further away from the TRILL network. In other words, an end device can be an aggregation point for a number of network devices to enter the TRILL network.

The term "ownership" refers to the right to remove a forwarding entry from all forwarding tables in a TRILL network. An ownership association is established when an RBridge learns a MAC address at a local port. Ownership association between an RBridge and a MAC address refers to the ownership association of all forwarding entries containing the MAC address in all forwarding tables in a TRILL network. In this disclosure, ownership association with a MAC address and ownership association with forwarding entries corresponding to the MAC address is used interchangeably.

The term "forwarding entry" refers to an entry in a forwarding table in a switch. The term "forwarding table" is used in a generic sense and can refer to any data structure that contains forwarding/routing information for forwarding a frame via a layer-2, layer-3, or TRILL network. In this disclosure, setting a bit refers to assigning a value of 1 to the bit, and clearing or unsetting a bit refers to assigning a value of 0 to the bit.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "RBridge identifier" is used as a generic term and is not limited to any bit format, and can refer to "RBridge ID" or "RBridge nickname" or any other format that can identify an RBridge.

Network Architecture

FIG. 1A illustrates an exemplary TRILL network with distributed forwarding information, in accordance with an embodiment of the present invention. As illustrated in FIG. 1, a TRILL network 100 includes RBridges 101, 102, 103, 104, and 105. End devices 112 and 114 are coupled to RBridge 101 and end devices 116 and 118 are coupled to RBridge 105. RBridges in network 100 use edge ports to communicate to end devices and TRILL ports to communicate to other RBridges. For example, RBridge 101 is coupled to end devices 112 and 114 via edge ports and to RBridges 102, 103, and 105 via TRILL ports.

In some embodiments, TRILL network 100 may be an Ethernet fabric switch. In some further embodiments, the Ethernet fabric switch may be a virtual cluster switch. In an exemplary Ethernet fabric switch, any number of RBridges in any arbitrary topology may logically operate as a single switch. Any new RBridge may join or leave the Ethernet fabric switch in "plug-and-play" mode without any manual configuration.

During operation, in FIG. 1, RBridge 101 dynamically learns the MAC addresses of end devices 112 and 114 when the devices send frames through RBridge 101 and stores them in a local forwarding table. In some embodiments, RBridge 101 distributes the learned MAC addresses to all other RBridges in network 100. Similarly, RBridge 105 learns the MAC addresses of end devices 116 and 118, and distributes the information to all other RBridges. During the distribution of the MAC addresses, a command to clear all dynamically learned MAC addresses can be issued from any of the RBridges, such as RBridge 103. In some embodiments, the clear command is issued from a user via a command line interface associated with RBridge 103. This simultaneous learning and clearing can lead to inconsistency in the forwarding tables in network 100.

To avoid such inconsistency, in some embodiments, an ownership association is established for a MAC address in the forwarding table. For example, as RBridge 101 locally learns the MAC addresses of end devices 112 and 114, RBridge 101 becomes the owner of the MAC addresses of end devices 112 and 114 in the forwarding tables of all RBridges in network 100. Similarly, RBridge 105 becomes the owner of the MAC addresses of end devices 116 and 118 in all forwarding tables in network 100. The ownership association ensures that only the owner of a MAC address can initiate the clearing process of the MAC address in network 100. When the first clear command is issued from RBridge 103, the command is propagated to all RBridges. Upon receiving the command, RBridge 101 clears the locally owned MAC addresses of end devices 112 and 114 from the local forwarding table and removes the ownership association of the MAC addresses. RBridge 101 then sends the updated ownership information and an associated second clear command to all other RBridges. These other RBridges then remove the entries for end devices 112 and 114 from their respective forwarding tables. Note that these other RBridges do not remove a forwarding entry owned by a remote RBridge after receiving the first clear command from RBridge 103. The forwarding entry is removed only after receiving the second clear command from the owner of the entry. Similarly, when RBridge 105 removes the ownership association for the MAC addresses of end devices 116 and 118, this removal information and an associated second clear command is propagated to all other RBridges. The other RBridges then update their respective forwarding tables accordingly.

During operation that does not involve ownership association for the dynamically learned MAC addresses, there can be inconsistencies in the forwarding tables across network 100 when a clear command is issued while an RBridge is updating a local forwarding table. In FIG. 1, during operation, RBridge 101 learns the MAC address of end devices 112 and 114, and sends the information to all other RBridges. While RBridge 101 is sending the information, a command to clear forwarding tables is issued from RBridge 103. The command reaches RBridges 104 while it has updated the local forwarding table with the MAC address of end device 112 but not with the MAC address of end device 114. After receiving the clear command, RBridge 104 clears the local forwarding table, which includes an entry for end device 112. However, after clearing the table, RBridge 104 learns the MAC address of end device 114 as the information is already sent from RBridge 101. As a result, the forwarding table in RBridge 104 includes the MAC address of RBridge 104. At the same time, when the clear command reaches RBridge 101, MAC addresses for end devices 112 and 114 are already in the local forwarding table. Consequently, RBridge 101 clears the local forwarding table and both MAC addresses are removed from the table. Hence, with distributed learning, forwarding tables in RBridges in network 100 can have inconsistencies.

In embodiments of the present invention, as illustrated in FIG. 1, during operation, RBridge 101 learns the MAC addresses of local end devices 112 and 114, and distributes this learned information to other RBridges in network 100. As these two MAC addresses are learned at RBridge 101, all other RBridges in network 100 consider RBridge 101 to be the owner of these two MAC addresses in their respective forwarding tables. For example, when RBridge 102 receives this learned MAC information, RBridge 101 is assigned as the owner of the entries in the local forwarding table associated with end devices 112 and 114. Similarly, RBridge 105 learns the MAC addresses of local end devices 116 and 118, distributes the information to other RBridges, and becomes the owner of the forwarding entries associated with end devices 116 and 118.

After receiving the first clear command issued from RBridge 103, RBridge 101 clears the MAC addresses of local end devices 112 and 114 from the local forwarding table. However, RBridge 101 does not clear MAC addresses learned from other RBridges, such as the MAC addresses of end devices 116 and 118. After clearing the locally owned MAC addresses from the local forwarding table, RBridge 101 issues a second clear command that indicates removal of ownership association between the MAC addresses of local end devices and RBridge 101, and contains a command to clear all MAC addresses owned by RBridge 101. Similarly, after receiving the first clear command, RBridge 105 clears locally owned MAC addresses from the local forwarding table, and sends a second clear command to terminate ownership of RBridge 105 and clear MAC addresses owned by RBridge 105. When the second clear command from RBridge 101 propagates to another RBridge (e.g., RBridge 102) in network 100, RBridge 102 clears all MAC address entries owned by RBridge 101 from the local forwarding table, while keeping entries from RBridge 105. When RBridge 102 receives the second clear command from RBridge 105, RBridge 102 then clears all MAC address entries owned by RBridge 105 from the local forwarding table as well.

Each RBridge removes entries owned by an RBridge from the local forwarding table only when the owner RBridge issues the second clear command. The owner RBridge issues the second clear command after sending out locally learned MAC address information. For example, if RBridge 101 has already learned the MAC addresses of end devices 112 and 114, the second clear command is issued from RBridge 101 after the learned MAC address information is distributed. As a result, other RBridges receive the second clear command after receiving the MAC addresses of end devices 112 and 114. Consequently, when other RBridges clear MAC addresses owned by RBridge 101, the MAC addresses of end devices 112 and 114 are cleared from the local forwarding table without creating any conflict.

During operation, the first clear command reaches RBridge 105 after learning the MAC address of end device 116. RBridge 105 then issues the second clear command. After issuing the second clear command, RBridge 105 learns the MAC address of end device 118 and distributes the learned MAC address to other RBridges. As a result, other RBridges first receive the MAC address of end device 116 and update their respective local forwarding tables. Afterward, other RBridges receive the second clear command and clear the MAC address of end device 116. Finally, other RBridges receive the MAC address of end device 118 and update their respective local forwarding tables. As a result, all RBridges in network 100, including RBridge 105, contain the same forwarding entry for end device 118. Hence, providing ownership association to each MAC address entry in forwarding tables and using a two-tier command for clearing MAC addresses from forwarding tables ensure consistency of distributed learning across the TRILL network.

Note that TRILL is only used as a transport between the switches within network 100. This is because TRILL can readily accommodate native Ethernet frames. Also, the TRILL standards provide a ready-to-use forwarding mechanism that can be used in any routed network with arbitrary topology. Embodiments of the present invention should not be limited to using only TRILL as the transport. Other protocols (such as multi-protocol label switching (MPLS)), either public or proprietary, can also be used for the transport.

Figure 1B:
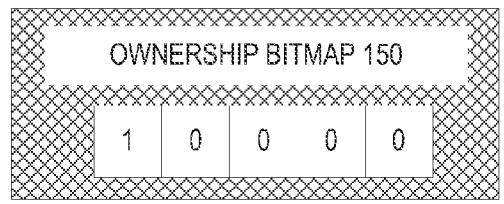
FIG. 1B illustrates an exemplary ownership bitmap for a layer-2 forwarding table entry, wherein the forwarding table entry can correspond to an end device associated with a remote RBridge, in accordance with an embodiment of the present invention.

FIG. 1B illustrates an exemplary ownership bitmap for a layer-2 forwarding table entry, wherein the forwarding table entry can correspond to an end device associated with a remote RBridge, in accordance with an embodiment of the present invention. In FIG. 1B, ownership bitmap 150 contains 5 bits, each of which represents the ownership of an RBridge. In some embodiments, the most significant bit of the bitmap is assigned to the RBridge with the largest identifier value. Assume, in FIG. 1A, that the identifier to RBridge 101 has the largest value. Consequently, the most significant bit of bitmap 150 in FIG. 1B is associated with RBridge 101. In this example, only the most significant bit of bitmap 150 is set. Hence, bitmap 150 represents an ownership by RBridge 101 and can be used to indicate the ownership of the MAC addresses of end devices 112 and 114 in respective forwarding tables in all RBridges in network 100.

Ownership in Virtual Link Agreation

Figure 2A:
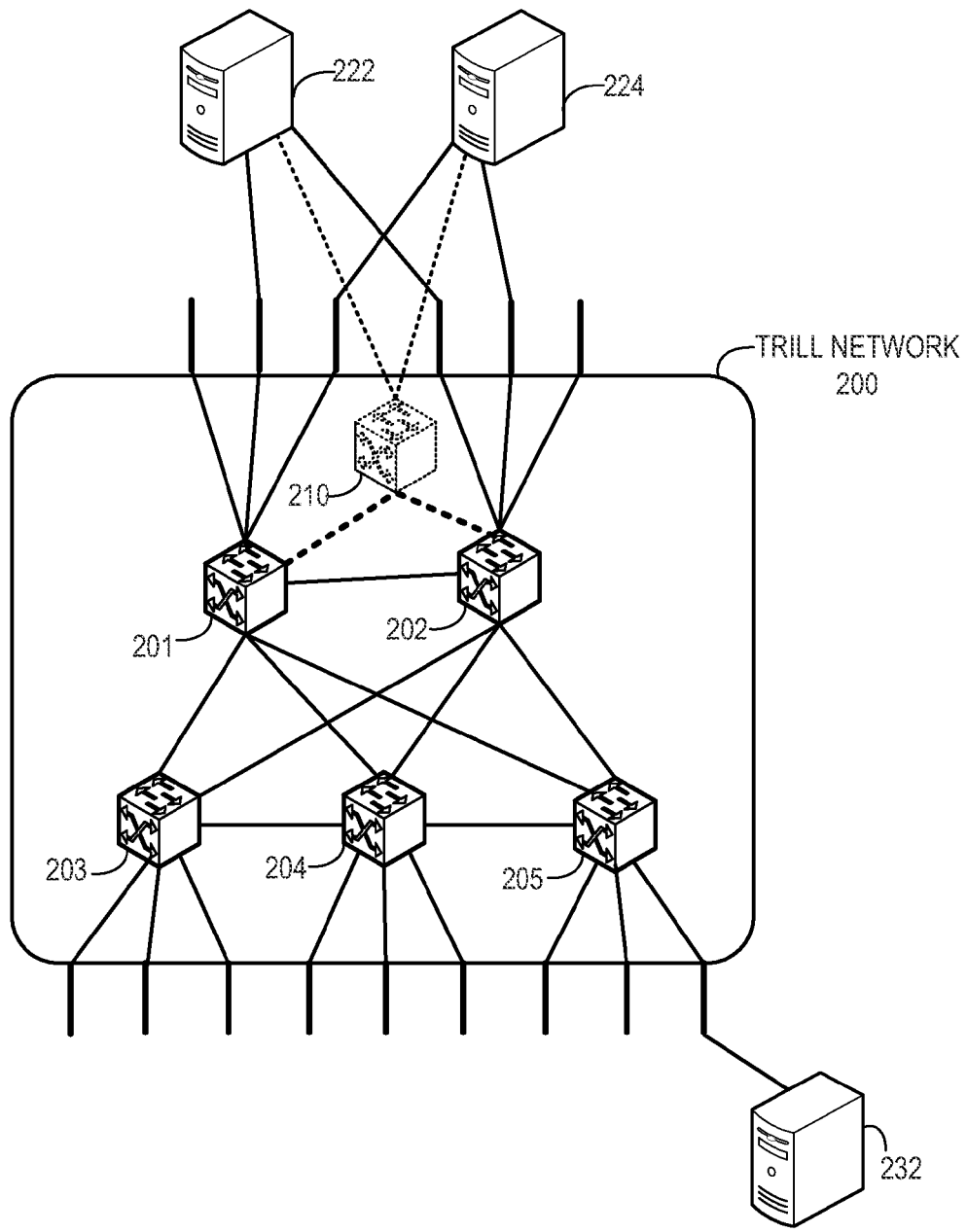
FIG. 2A illustrates an exemplary network where a virtual RBridge identifier is assigned to two physical TRILL RBridges which are coupled to end devices via virtually aggregated links, in accordance with an embodiment of the present invention.

In a virtual link aggregation, multiple RBridges can learn the MAC address of an end device and may become the owner of all forwarding entries associated with the MAC address. The ownership association and the two-tier clear command can maintain consistency in forwarding tables for such multiple ownership entries as well. FIG. 2A illustrates an exemplary network where a virtual RBridge identifier is assigned to two physical TRILL RBridges which are coupled to end devices via virtually aggregated links, in accordance with an embodiment of the present invention. As illustrated in FIG. 2A, a TRILL network 200 includes RBridges 201, 202, 203, 204, and 205. RBridge 205 is coupled to an end device 232. End devices 222 and 224 are both dual-homed and coupled to RBridges 201 and 202. The goal is to allow a dual-homed end station to use both physical links to two separate TRILL RBridges as a single, logical aggregate link, with the same MAC address. Such a configuration would achieve true redundancy and facilitate fast protection switching.

RBridges 201 and 202 are configured to operate in a special "trunked" mode for end devices 222 and 224. End devices 222 and 224 view RBridges 201 and 202 as a common virtual RBridge 210, with a corresponding virtual RBridge identifier. Dual-homed end devices 222 and 224 are considered to be logically coupled to virtual RBridge 210 via logical links represented by dotted lines. Virtual RBridge 210 is considered to be logically coupled to both RBridges 201 and 202, optionally with zero-cost links (also represented by dotted lines). RBridges which participate in link aggregation and form a virtual RBridge are referred to as "partner RBridges."

When end device 222 sends a packet to end device 232 via ingress RBridge 201, RBridge 201 learns the MAC address of end device 222 and distributes the learned MAC address to all other RBridges in network 200. All other RBridges update their respective forwarding tables with an entry corresponding to end device 222 and assign RBridge 201 as the owner of the entry. As end device 222 is coupled to RBridge 202, end device 222 may send a packet to end device 232 via RBridge 202 as well. Consequently, RBridge 202 learns the MAC address of end device 222 and distributes the learned MAC address to all other RBridges in network 200. All other RBridges then add RBridge 202 as an owner of the entry associated with end device 222 as well.

Figure 2B:
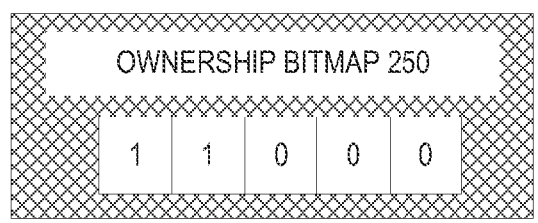
FIG. 2B illustrates an exemplary ownership bitmap for a layer-2 forwarding table entry, wherein the forwarding table entry corresponds to an end device associated with a virtual RBridge, in accordance with an embodiment of the present invention.

FIG. 2B illustrates an exemplary ownership bitmap for a layer-2 forwarding table entry, wherein the forwarding table entry corresponds to an end device associated with a virtual RBridge, in accordance with an embodiment of the present invention. The two most significant bits of ownership bitmap 250 in FIG. 2B are associated with RBridges 201 and 202, respectively. In this example, only the two most significant bits of bitmap 250 are set. Hence, bitmap 250 represents an ownership by RBridges 201 and 202, and can be used to indicate the ownership of the MAC addresses of end devices 222 and 224 in respective forwarding tables in all RBridges in network 200.

In FIG. 2A, during operation, a first command to clear dynamically learned MAC addresses from forwarding tables is issued from RBridge 203. Upon receiving the first clear command, RBridge 201 issues a second clear command to terminate ownership of entries owned by RBridge 201. When other RBridges receive this second command, they remove the ownership associations between RBridge 201 and the MAC addresses of end devices 222 and 224. In some embodiments, the ownership association is removed by clearing the bit corresponding to RBridge 201 in an ownership bitmap. However, as forwarding entries associated with end devices 222 and 224 are also owned by RBridge 202, other RBridges do not remove these entries from local forwarding tables. Upon receiving the first clear command, RBridge 202 also issues the second clear command to terminate ownership of entries owned by RBridge 202. When other RBridges receive this second command from RBridge 202, the ownership associations between RBridge 201 and the MAC addresses of end devices 222 and 224 are terminated. As no other RBridge owns the entries for the MAC addresses of end devices 222 and 224, they are removed from the respective forwarding tables in all RBridges in network 200.

Ownership Association Management

Figure 3A:
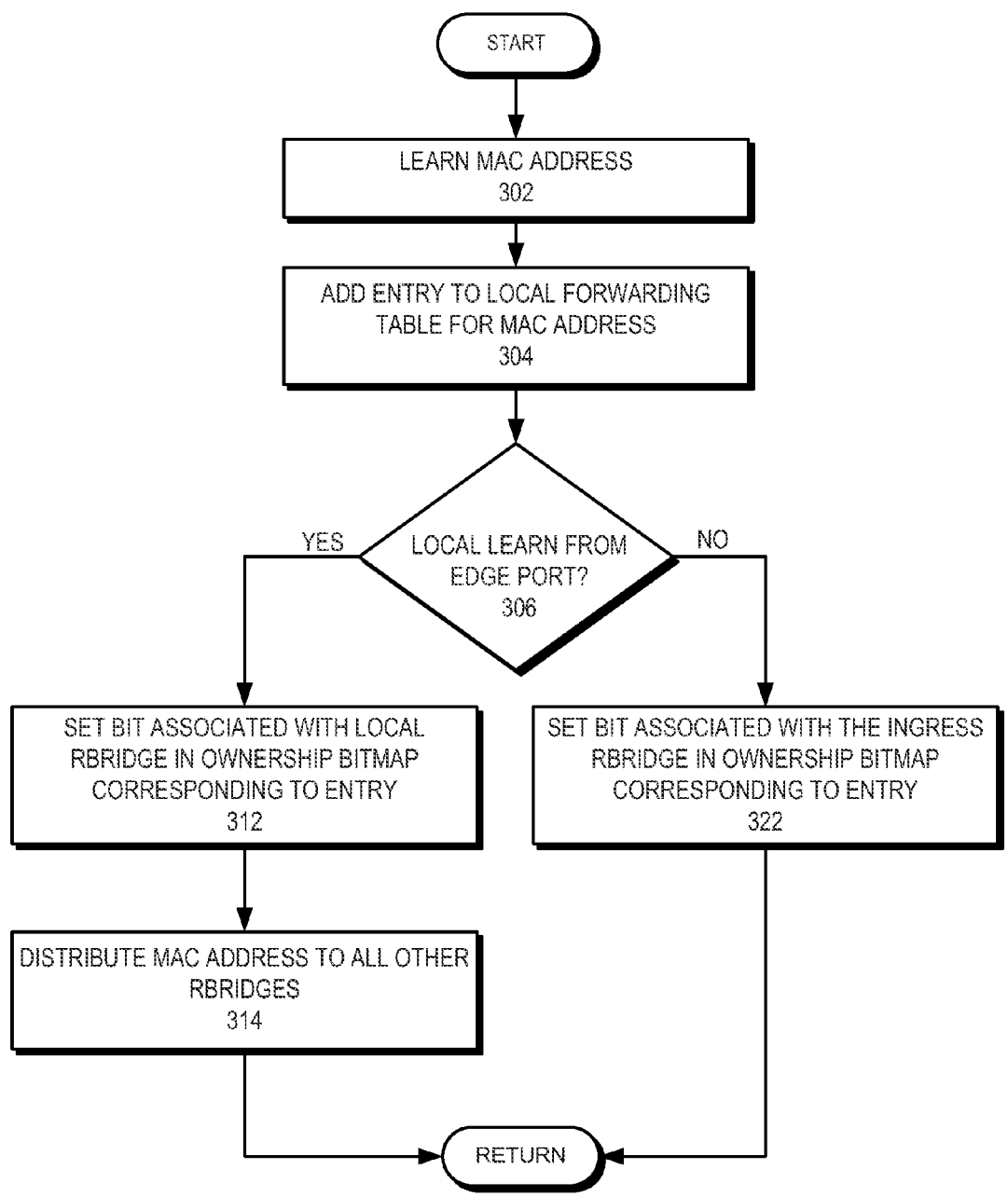
FIG. 3A presents a flowchart illustrating the process of an RBridge updating an ownership bitmap, in accordance with an embodiment of the present invention.

FIG. 3A presents a flowchart illustrating the process of an RBridge updating an ownership bitmap, in accordance with an embodiment of the present invention. Upon learning a MAC address (operation 302), the RBridge adds an entry to the local forwarding table corresponding to the MAC address (operation 304). The RBridge then checks whether the MAC address was learned locally from an edge port (operation 306). If the MAC address is of a local end device and the learn was from an edge port, then the RBridge sets the bit associated with the local RBridge in an ownership bitmap associated with the MAC address entry (operation 312) indicating an ownership association between the RBridge and the entry. The RBridge then distributes the learned MAC address to all other RBridges in the network (operation 314). If the MAC address was not learned from an edge port, then the MAC address is learned from a TRILL packet and the end device associated with the MAC address is local to the ingress RBridge of the TRILL header. Under such a scenario, the RBridge sets the bit associated with the ingress RBridge in an ownership bitmap associated with the MAC address entry (operation 322).

Figure 3B:
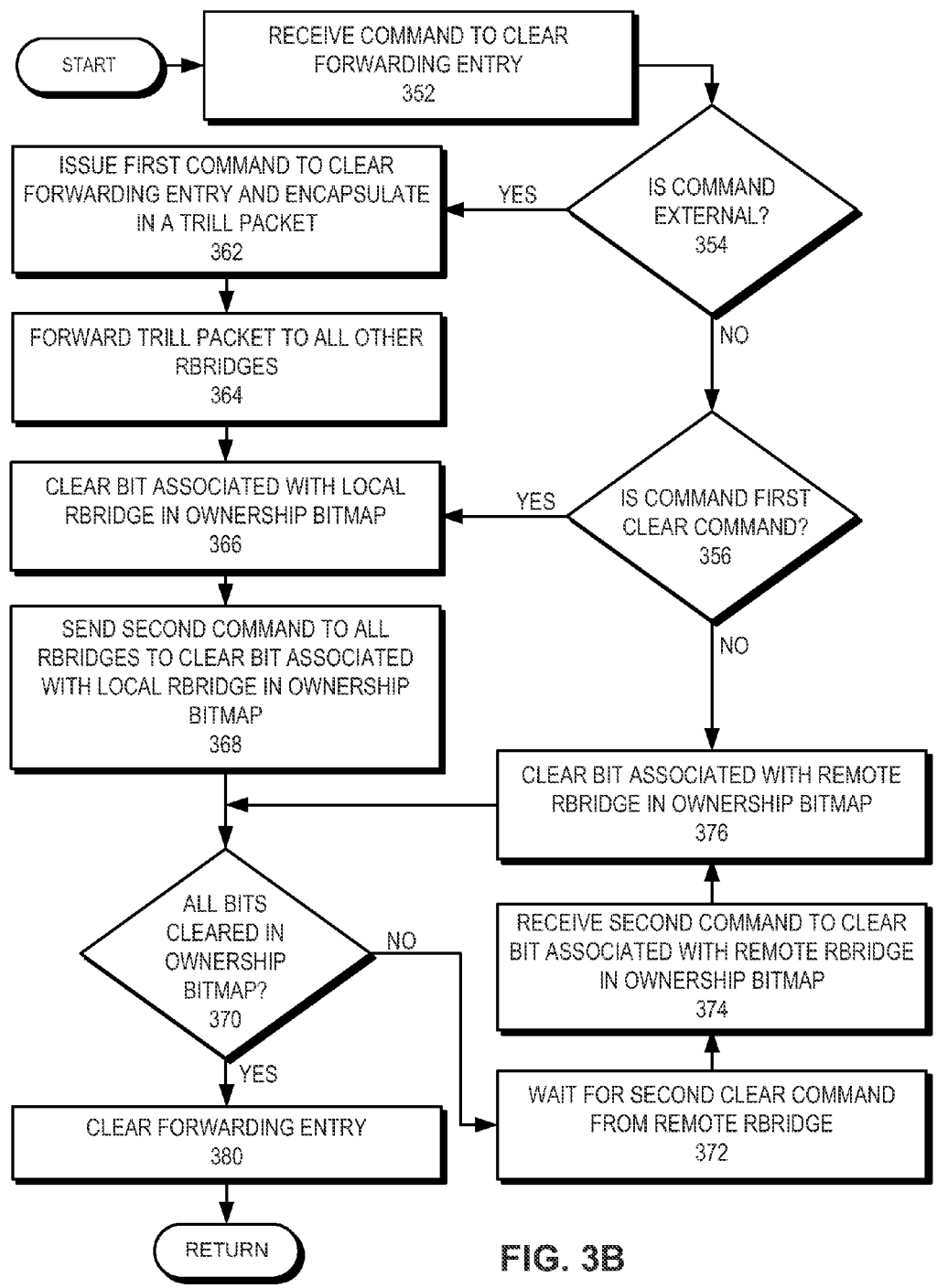
FIG. 3B presents a flowchart illustrating the process of clearing an entry in a forwarding table, wherein the entry can be associated with a virtual RBridge, in accordance with an embodiment of the present invention.

FIG. 3B presents a flowchart illustrating the process of clearing an entry in a forwarding table, wherein the entry can be associated with a virtual RBridge, in accordance with an embodiment of the present invention. An RBridge receives a command to clear a forwarding entry (operation 352). In some embodiments, the command is to clear multiple forwarding entries. The RBridge checks whether the command is an external command (operation 354). In some embodiments, an external command is given via a command line interface associated with the RBridge. If the command is an external command, then the RBridge issues a first clear command to clear the forwarding entry and encapsulates the command message in a TRILL packet (operation 362) and forwards the TRILL packet to all other RBridges in the TRILL network (operation 364). Then the RBridge clears the bit associated with the local RBridge in the ownership bitmap for the entry (operation 366) and sends a second clear command to all other RBridges to clear the bit associated with the local RBridge in the ownership bitmap for the entry (operation 368). If the command is not external (operation 354), then the command is received from a TRILL port and the RBridge checks whether the command is a first clear command (operation 356). If so, then the RBridge clears the bit associated with local RBridge (operation 366) in the ownership bitmap for the entry and sends a second clear command to clear the bit associated with the local RBridge (operation 368). If the command is not a first clear command (operation 356), then the RBridge clears the bit associated with the remote RBridge from which the command was issued in the ownership bitmap for the entry (operation 376).

After sending the second command (operation 368) or after clearing a bit associated with a remote RBridge (operation 376), the RBridge checks whether all bits in the ownership bitmap are cleared (operation 370). If not, then the RBridge waits to receive other second clear commands from remote RBridges to clear the set bits (operation 372). Upon receiving a second clear command from a remote RBridge to clear a set bit (operation 374), the RBridge clears the bit associated with the remote RBridge in the ownership bitmap (operation 376) and again checks whether all bits in the ownership bitmap are cleared (operation 370) until all bits in the ownership bitmap are cleared. When all bits are cleared, the RBridge clears the corresponding forwarding entry (operation 380). In some embodiments, the ownership bitmap can be associated with multiple forwarding entries. Under such a scenario, in operation 380, the RBridge clears all entries associated with the ownership bitmap.

Failure Handling

Figure 4A:
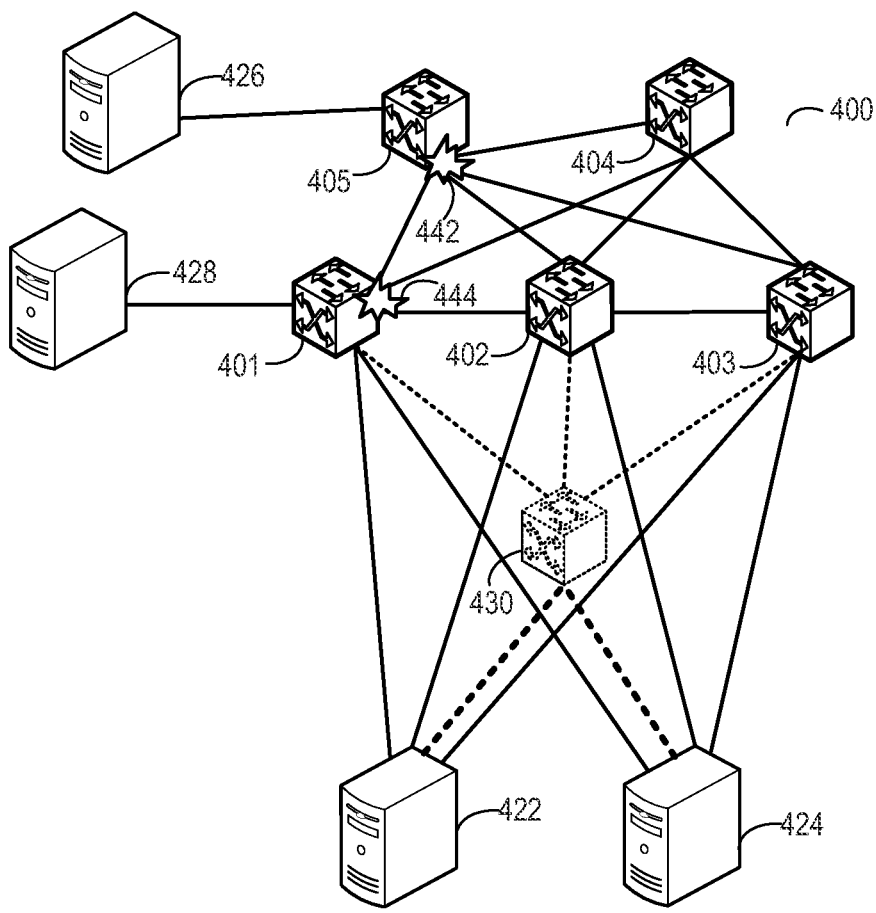
FIG. 4A illustrates failure scenarios in a TRILL network with distributed forwarding information, in accordance with an embodiment of the present invention.

FIG. 4A illustrates failure scenarios in a TRILL network with distributed forwarding information, in accordance with an embodiment of the present invention. As illustrated in FIG. 4A, a TRILL network 400 includes RBridges 401, 402, 403, 404, and 405. End device 426 is coupled to RBridge 405 and end device 428 is coupled to RBridge 401. End devices 422 and 424 are both multi-homed and coupled to RBridges 401, 402, and 403. End devices 422 and 424 view RBridges 401, 402, and 403 as a common virtual RBridge 430, with a corresponding virtual RBridge identifier. Forwarding tables in all RBridges include entries for MAC addresses of end devices 422, 424, 426, and 428. Entries associated with end devices 422 and 424 are owned by RBridges 401, 402, and 403. Entries associated with end devices 426 and 428 are owned by RBridges 405 and 401, respectively.

Suppose that a failure 442 occurs during operation that disconnects RBridge 405 from network 400. When another RBridge (e.g., RBridge 402) in network 400 becomes aware of the failure, the ownership association for all entries corresponding to RBridge 405 in the forwarding table in RBridge 402 becomes terminated. Consequently, the entries corresponding to RBridge 405 are cleared from the local forwarding table in RBridge 402. In other words, failure 442 causes RBridge 402 to react in the same way as receiving a second clear message issued from RBridge 405, as described in conjunction with FIG. 3B. Similarly, when all other RBridges become aware of failure 442, they clear the entries corresponding to RBridge 405 from respective local forwarding tables.

Suppose that a failure 444 occurs during operation that disconnects RBridge 401 from network 400. Consequently, RBridge 401 cannot participate in forming virtual RBridge 430 and can no longer own forwarding entries associated with end devices 422 and 424. When another RBridge, such as RBridge 404, in network 400 becomes aware of the failure, the ownership association for all entries corresponding to RBridge 401 in the forwarding table in RBridge 404 becomes terminated. Consequently, the forwarding entry associated with end device 428 is cleared from the local forwarding table in RBridge 404. However, as forwarding entries associated with end devices 422 and 424 are owned by RBridges 402 and 403 as well, these entries are not cleared from the local forwarding table at RBridge 404. Failure 444 also causes RBridge 404 to react in the same way as receiving a second clear message issued from RBridge 401, as described in conjunction with FIG. 3B.

Figure 4B:
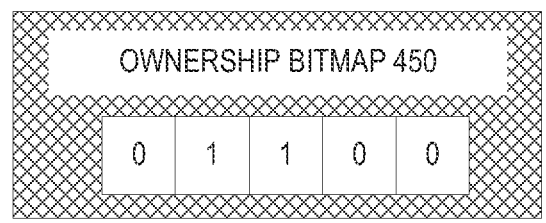
FIG. 4B illustrates an exemplary ownership bitmap in a failure scenario for a layer-2 forwarding table entry, wherein the forwarding table entry corresponds to an end device associated with a virtual RBridge, in accordance with an embodiment of the present invention.

FIG. 4B illustrates an exemplary ownership bitmap in a failure scenario for a layer-2 forwarding table entry, wherein the forwarding table entry corresponds to an end device associated with a virtual RBridge, in accordance with an embodiment of the present invention. In this example, ownership bitmap 450 shows the ownership association for forwarding entries associated with end devices 422 and 424 after failure 444 occurs, as described in conjunction with FIG. 4A. Assume the most significant bit of bitmap 450 is associated with RBridge 401. As failure 444 in FIG. 4A terminates the ownership association of RBridge 401, the most significant bit becomes cleared in the forwarding tables in all other RBridges in network 400. As next two bits in bitmap 450 correspond to RBridges 402 and 403, these two bits remain set. Consequently, all forwarding entries associated with bitmap 450 are not removed from forwarding tables.

Aging Out in Virtual Link Agreation

Figure 5A:
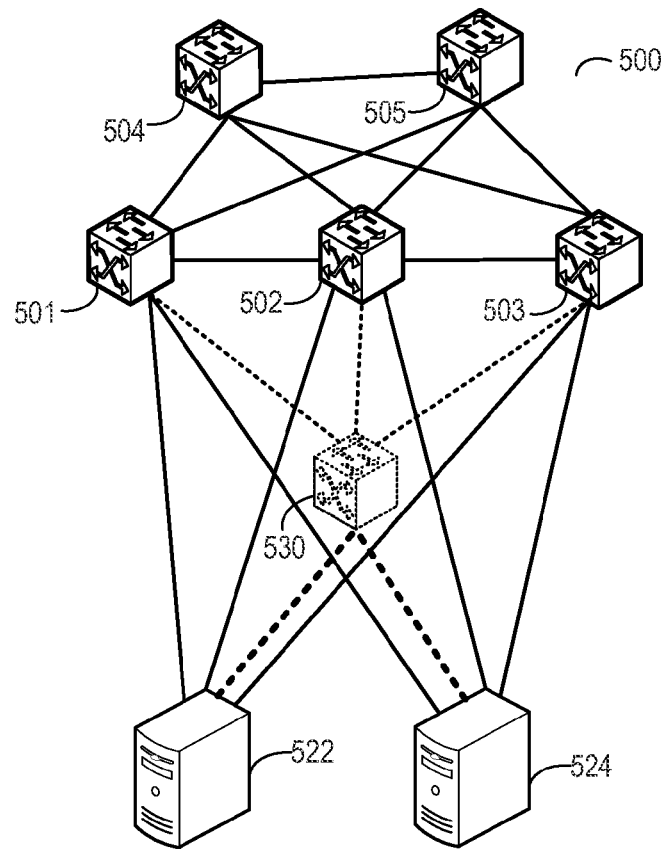
FIG. 5A illustrates an exemplary network where a virtual RBridge identifier is assigned to three physical TRILL RBridges which are coupled to end devices via virtually aggregated links, wherein the RBridges share age-out information of end devices, in accordance with an embodiment of the present invention.

In an RBridge, if there is inactivity from an end device over a certain period of time, the dynamically learned MAC address of the end device ages out and is removed from the forwarding table. However, if such an entry is associated with a virtual link aggregation, the MAC address can be learned on multiple RBridges and the entry should not age out unless it ages out at all RBridges in the link aggregation. FIG. 5A illustrates an exemplary network where a virtual RBridge identifier is assigned to three physical TRILL RBridges which are coupled to end devices via virtually aggregated links, wherein the RBridges share age-out information of end devices, in accordance with an embodiment of the present invention. As illustrated in FIG. 5A, a TRILL network 500 includes RBridges 501, 502, 503, 504, and 505. End devices 522 and 524 are both multi-homed and coupled to RBridges 501, 502, and 503. End devices 522 and 524 view RBridges 501, 502, and 503 as a common virtual RBridge 530, with a corresponding virtual RBridge identifier.

During operation, RBridges 501, 502, and 503 dynamically learn the MAC addresses of end devices 522 and 524. Afterward, end device 522 and receives sends all packets for virtual RBridge 530 via RBridge 503. As a result, the forwarding entry of end device 522 remains inactive at RBridges 501 and 502 over a period of time, and becomes a candidate for aging out. However, as RBridge 503 is still receiving packets for virtual RBridge 530, the forwarding entry of end device 522 should not age out at RBridges 501 and 502. In some embodiments, if RBridge 503 becomes unavailable to end device 522, all packets for virtual RBridge 530 are sent to another partner RBridge (e.g., RBridge 502). As RBridge 502 still contains the forwarding entry for end device 522, RBridge 502 can readily take over. When end device 522 stops sending and receiving packets for virtual RBridge 530, the forwarding entry of end device 522 becomes a candidate for aging out at all partner RBridges. Only then should the forwarding entry for end device 522 be aged out at all partner RBridges.

Figure 5B:
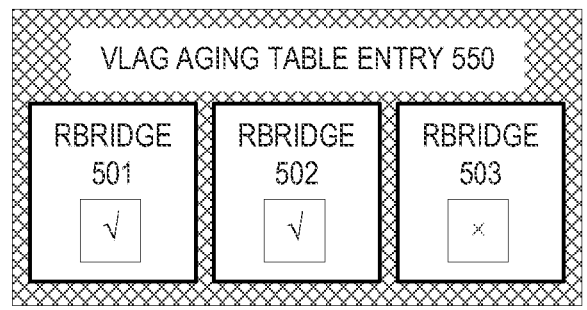
FIG. 5B illustrates an exemplary virtual link aggregation aging table entry, in accordance with an embodiment of the present invention.

FIG. 5B illustrates an exemplary virtual link aggregation aging table entry, in accordance with an embodiment of the present invention. In FIG. 5B, virtual link aggregation aging table entry 550 contains three flags corresponding to partner RBridges 501, 502, and 503, respectively. Partner RBridges 501, 502, and 503 have an aging table entry 550 for a respective multi-homed end device, such as end devices 522 and 524, as described in conjunction with FIG. 5A. In aging table entry 550, flags for RBridges 501 and 502 are set (denoted using a check mark), indicating that the forwarding entry is a local candidate for aging out. However, the flag for RBridge 503 is not set (denoted using a cross mark), which indicates that the forwarding entry is not a candidate for aging out. In some embodiments, aging table entry 550 is represented by a bitmap.

Whenever an RBridge makes an update to the local aging table, the RBridge sends the updated table to all other partner RBridges. Upon receiving the table, other partner RBridges accordingly update their respective local aging tables. In some embodiments, one RBridge in the partner RBridges is elected to decide if a forwarding entry should be aged out in all partner RBridges. If all flags in the aging table are set for an entry, the elected RBridge ages out the entry in the local forwarding table, and notifies all partner RBridges. Upon receiving the notification, other partner RBridges age out the entry from their respective local forwarding tables as well.

Figure 5C:
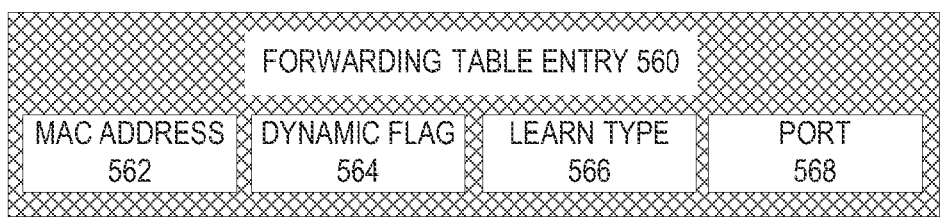
FIG. 5C illustrates an exemplary layer-2 forwarding entry associated with an aging table, in accordance with an embodiment of the present invention.

FIG. 5C illustrates an exemplary layer-2 forwarding entry associated with an aging table, in accordance with an embodiment of the present invention. In FIG. 5C, forwarding table entry 560 contains a MAC address 562, a dynamic flag 564, a learn type 566, and a port 568. MAC address 562 corresponds to the MAC address of the end device with which forwarding table entry 560 is associated. Dynamic flag 564 indicates if the MAC address is dynamically learned. In some embodiments, a set value for dynamic flag 564 indicates a "dynamic" and a clear value indicates a "static" forwarding table entry. Learn type 566 indicates how MAC address 562 is learned. In some embodiments, the values for learn type 566 include "locally learned," "remotely learned," and "not learned." Port 568 identifies the interface from which MAC address 562 is learned.

When a forwarding entry associated with a virtual link aggregation in a partner RBridge remains inactive over a period of time, the entry continues to locally age out. To prevent this continuous aging out, when the entry becomes a local candidate for aging out, dynamic flag 564 is set to static, indicating that the address is not dynamic and should not age out. Furthermore, the RBridge can still receive packets from the end device associated with the entry after the entry becomes a candidate for aging out. To avoid any conflict, learn type 566 is set as "remotely learned" or "not learned" when the entry becomes the candidate. In this way, the RBridge can locally learn the MAC address again.

Aging Out Management

Figure 6:
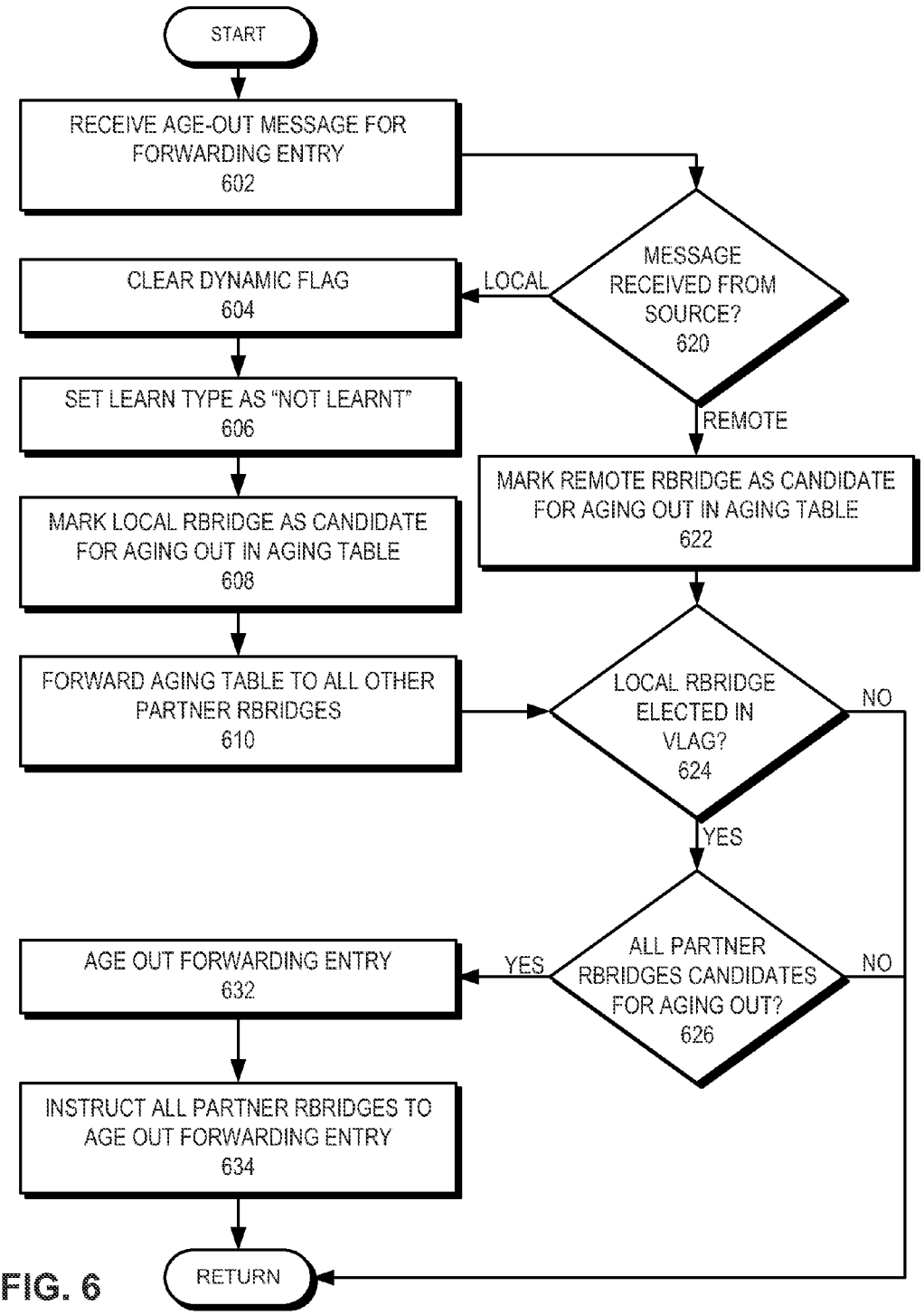
FIG. 6 presents a flowchart illustrating the process of an RBridge aging out a forwarding table entry, in accordance with an embodiment of the present invention.

FIG. 6 presents a flowchart illustrating the process of an RBridge aging out a forwarding table entry, in accordance with an embodiment of the present invention. Upon receiving an age-out message for a forwarding entry (operation 602), the RBridge checks the source of the message (operation 620). If it is a local message, then the entry has become a local candidate for aging out. In some embodiments, a local age-out message is generated by a hardware driver of the RBridge. Under such a scenario, the RBridge clears the corresponding dynamic flag (operation 604) and sets the learn type as "not learned" (operation 606). The RBridge then marks the local RBridge as a local candidate for aging out in the local aging table (operation 608) and forwards the updated aging table to all other partner RBridges (operation 610). In some embodiments, marking an RBridge involves setting a bit associated with the RBridge in a bitmap. If the age-out message is remote (operation 620), then the message is from a TRILL port from a partner RBridge. Under such a scenario, the RBridge marks the remote partner RBridge as a candidate for aging out in the local aging table (operation 622). After either forwarding the updated aging table (operation 610) or marking the remote RBridge as a candidate for aging out (operation 622), the RBridge checks whether the local RBridge is elected to decide if the entry is aged out in the link aggregation (operation 624). If so, then the RBridge checks whether all partner RBridges are candidates for aging out for the entry (operation 626). If all partner RBridges are candidates, then the RBridge ages out the forwarding entry from the local forwarding table (operation 632) and instructs all partner RBridges to age out the forwarding entry (operation 634).

Figure 7:
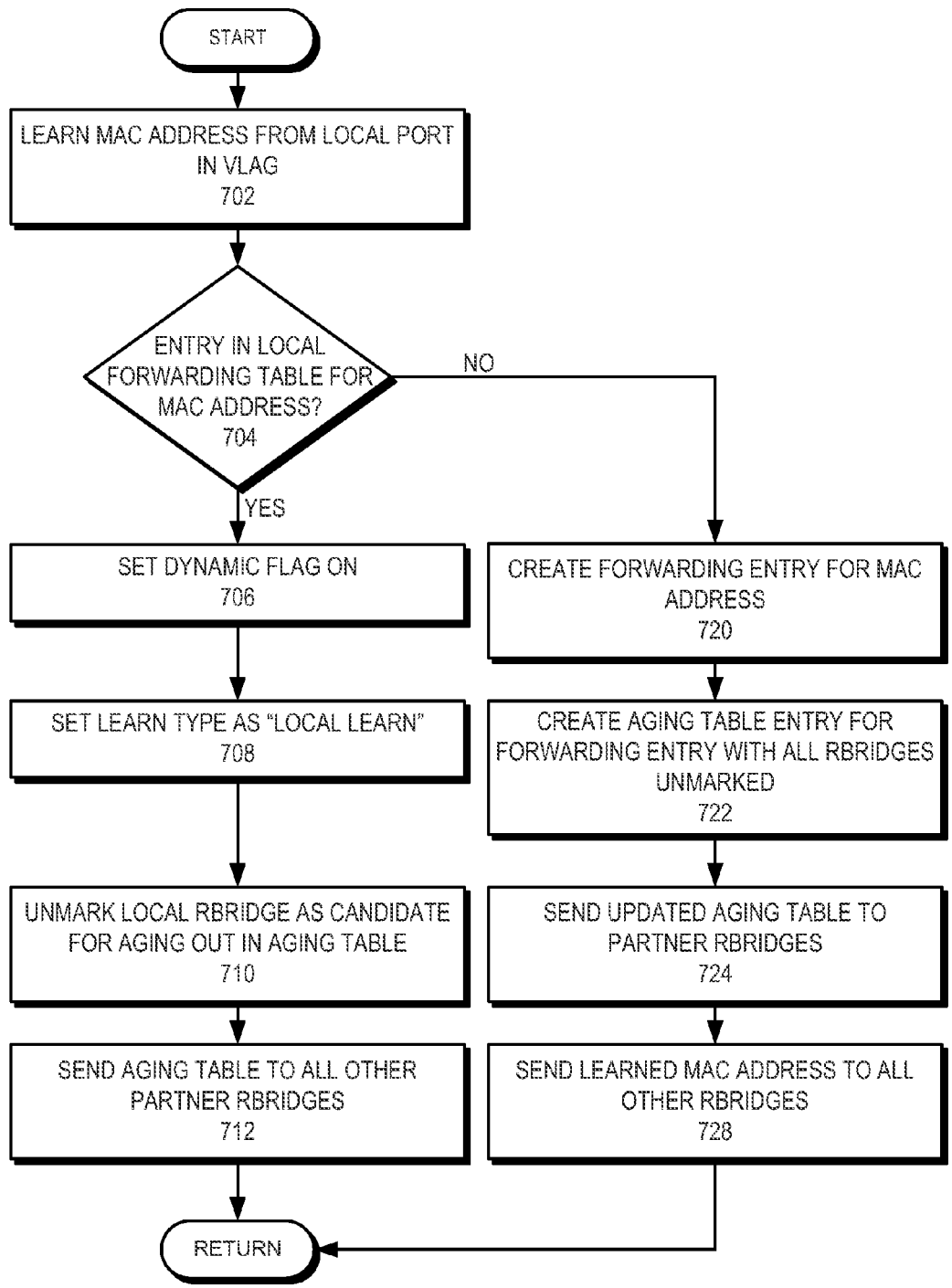
FIG. 7 presents a flowchart illustrating the process of an RBridge updating an aging table entry and an associated forwarding table entry, in accordance with an embodiment of the present invention.

While a forwarding entry in an RBridge can be a candidate for aging out, the RBridge may still receive a packet from the end device associated with the entry. Under such a scenario, the RBridge should again locally learn the MAC address of the end device, update the corresponding entry accordingly, and unmark the RBridge in the aging table. FIG. 7 presents a flowchart illustrating the process of an RBridge updating an aging table entry and an associated forwarding table entry, in accordance with an embodiment of the present invention. During operation, the RBridge learns a MAC address from a local port participating in a virtual link aggregation (operation 702).

A learn from a virtual link aggregation can indicate either a new learn or a learn for a forwarding entry which is a candidate for aging out. Hence, the RBridge then checks whether there is a forwarding entry for the MAC address in the local forwarding table (operation 704). If so, then the RBridge sets the dynamic flag on (operation 706), indicating that the forwarding entry for the MAC address can become a candidate for aging out again. The RBridge then sets the learn type as "local learn" (operation 708), unmarks the local RBridge in the local aging table (operation 710), and forwards the updated aging table to all other partner RBridges (operation 712). If there is no entry for the MAC address in the local forwarding table (operation 704), then the learned MAC address is a new learn. Under such a scenario, the RBridge creates a forwarding entry for the MAC address (operation 720) and an aging table entry for the forwarding entry with all RBridges unmarked as candidates for aging out (operation 722). The RBridge then sends the updated aging table to all partner RBridges (operation 724) and sends the learned MAC address to all other RBridges in the TRILL network (operation 728).

Exemplary Switch System

FIG. 8 illustrates an exemplary architecture of a switch with distributed forwarding table update capability, in accordance with an embodiment of the present invention. In this example, an RBridge 800 includes a number of edge ports 802 and TRILL ports 804, a TRILL management module 820, an ownership module 830, an Ethernet frame processor 810, and a storage 850. TRILL management module 820 further includes a TRILL header processing module 822 and a notification module 826.

TRILL ports 804 include inter-switch communication channels for communication with one or more RBridges. These inter-switch communication channels can be implemented via a regular communication port and based on any open or proprietary format. Furthermore, the inter-switch communication between RBridges is not required to be direct port-to-port communication.

During operation, edge ports 802 receive frames from (and transmit frames to) end devices. Ethernet frame processor 810 extracts and processes header information from the received frames. From the extracted header, RBridge 800 learns the MAC addresses of end devices. Ownership module 830 creates an ownership association between the RBridge and the learned MAC addresses. Notification module 826 creates notification messages about the ownership association. TRILL header processing module 822 encapsulates the notification messages in TRILL packets and forwards the notification to all other RBridges.

In some embodiments, RBridge 800 may participate in a virtual link aggregation and form a virtual RBridge, wherein TRILL management module 820 further includes a virtual RBridge configuration module 824, and ownership module 830 further includes an age-out control module 836. TRILL header processing module 822 generates the TRILL header and outer Ethernet header for ingress frames corresponding to the virtual RBridge. Virtual RBridge configuration module 824 manages the communication with RBridges associated with the virtual RBridge and handles various inter-switch communications, such as link and node failure notifications. Virtual RBridge configuration module 824 allows a user to configure and assign the identifier for the virtual RBridges. Furthermore, age-out control module 836 handles aging out of forwarding entries associated with dynamically learned MAC addresses from the virtual link aggregation.

In some embodiments, RBridge 800 is in an Ethernet fabric switch, and may include a virtual switch management module 840 and a logical switch 842. Virtual switch management module 840 maintains a configuration database in storage 850 that maintains the configuration state of every switch within the fabric switch. Virtual switch management module 840 also maintains the state of logical switch 842, which is used to join other fabric switches. In some embodiments, logical switch 842 can be configured to operate in conjunction with Ethernet frame processor 810 as a logical Ethernet switch.

Note that the above-mentioned modules can be implemented in hardware as well as in software. In one embodiment, these modules can be embodied in computer-executable instructions stored in a memory which is coupled to one or more processors in RBridge 800. When executed, these instructions cause the processor(s) to perform the aforementioned functions.

In summary, embodiments of the present invention provide a switch, a method and a system for distributed management of layer-2 address table entries. In one embodiment, the switch includes an ownership management mechanism and a notification mechanism. The ownership management mechanism maintains a local ownership association between the switch and a medium access control (MAC) address learned at the switch, and terminates the local ownership association for the MAC address. The notification mechanism generates a first notification specifying the local ownership association and a second notification specifying the termination of the local ownership association.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
    an ownership management module operable to:
        maintain a local ownership association between the switch and a media access control (MAC) address learned at the switch;
        terminate the local ownership association for the MAC address; and
        terminate an ownership association for a MAC address learned at a remote switch, in response to identifying a corresponding notification from the remote switch; and
    a notification module operable to:
        generate a first notification indicating the local ownership association; and
        generate a second notification indicating the termination of the local ownership association.

2. The switch of claim 1, wherein the second notification includes a first tier message indicating initiation of the termination and a second tier message indicating the termination of specific ownership association with the switch.

3. The switch of claim 1, wherein the switch is a Transparent Interconnection of Lots of Links (TRILL) routing bridge (RBridge).

4. The switch of claim 1, wherein the ownership association is indicated by a bit in a bitmap, and wherein the bit is associated with the switch.

5. The switch of claim 1, wherein the switch is part of a link aggregation;
    wherein the switch further comprises an age-out control module operable to create an age-out indication for the switch and a MAC address learned at the switch, in response to inactivity from the MAC address over a period of time; and
    wherein the notification module is further operable to generate a third notification associated with the age-out indication.

6. The switch of claim 1, wherein the ownership module is further operable to terminate an ownership association for a MAC address learned at a remote switch in response to detecting a failure to the remote switch.

7. A switch, comprising:
    an ownership management module operable to:
        maintain a local ownership association between the switch and a medium access control (MAC) address learned at the switch; and
        terminate the local ownership association for the MAC address;
    a notification mechanism module operable to:
        generate a first notification indicating the local ownership association; and
        generate a second notification indicating the termination of the local ownership association; and
    an age-out control module operable to:
        create an age-out indication for the switch and a MAC address learned at the switch, in response to inactivity from the MAC address over a period of time; and
        suppress local age-out notifications for the MAC address in response to creating the age-out indication.

8. The switch of claim 7, wherein the second notification includes a first tier message indicating initiation of the termination and a second tier message indicating the termination of specific ownership association with the switch.

9. A method, comprising:
    maintaining a local ownership association between a switch and a media access control (MAC) address learned at the switch;
    generating a first notification indicating the local ownership association;
    terminating the local ownership association for the MAC address;
    generating a second notification indicating the termination of the local ownership association; and
    terminating an ownership association for a MAC address learned at a remote switch, in response to receiving a notification from the remote switch.

10. The method of claim 9, wherein the second notification includes a first tier message indicating initiation of the termination and a second tier message indicating the termination of specific ownership association with the switch.

11. The method of claim 8, wherein the switch is a Transparent Interconnection of Lots of Links (TRILL) routing bridge (RBridge).

12. The method of claim 9, wherein the ownership association is indicated by a bit in a bitmap, and wherein the bit is associated with the switch.

13. The method of claim 9, wherein the switch is part of a link aggregation; and
    further comprising:

creating an age-out indication for the switch and a MAC address learned at the switch, in response to inactivity from the MAC address over a period of time; and generating a third notification associated with the age-out indication.

14. The method of claim 9, further comprising terminating an ownership association for a MAC address learned at a remote switch in response to detecting a failure to the remote switch.

15. A method comprising:
maintaining a local ownership association between a switch and a media access control (MAC) address learned at the switch;
generating a first notification indicating the local ownership association;
terminating the local ownership association for the MAC address;
generating a second notification indicating the termination of the local ownership association;
creating an age-out indication for the switch and a MAC address learned at the switch, in response to inactivity from the MAC address over a period of time; and
suppressing local age-out notifications for the MAC address in response to creating the age-out indication.

16. The method of claim 15, wherein the second notification includes a first tier message indicating initiation of the termination and a second tier message indicating the termination of specific ownership association with the switch.

17. A computing system, comprising:
a processor; and
a non-transitory computer-readable storage medium storing instructions which when executed by the processor causes the processor to perform a method, the method comprising:
maintaining a local ownership association between the computing system and a media access control (MAC) address learned at the computing system;
generating a first notification indicating the local ownership association;
terminating the local ownership association for the MAC address;
generating a second notification indicating the termination of the local ownership association; and
terminating an ownership association for a MAC address learned at a remote computing system, in response to identifying a corresponding notification from the remote computing system.

18. The computing system of claim 17, wherein the second notification includes a first tier message indicating initiation of the termination and a second tier message indicating the termination of specific ownership association with the computing system.

19. The computing system of claim 17, wherein the computing system and the second computing system are Transparent Interconnection of Lots of Links (TRILL) routing bridges (RBridges).

20. The computing system of claim 17, wherein the ownership association is indicated by a bit in a bitmap, and wherein the bit is associated with the computing system.

21. The system of claim 17, wherein the computing system is part of a in aggregation;
wherein the method further comprises:
creating age-out indication for the computing system and a MAC address learned at the computing system, in response to inactivity from the MAC address over a period of time; and generating a third notification associated with the age-out indication.

22. The computing system of claim 17, wherein the method further comprises terminating an ownership association for a MAC address learned at a remote computing device in response to detecting a failure to the remote computing device.

23. A computing system, comprising:
a processor; and
a non-transitory computer-readable storage medium storing instructions which when executed by the processor causes the processor to perform a method, the method comprising:
maintaining a local ownership association between the computing system and a media access control (MAC) address learned at the computing system;
generating a first notification indicating the local ownership association;
terminating the local ownership association for the MAC address;
generating a second notification indicating the termination of the local ownership association;
creating an age-out indication for the computing system and a MAC address learned at the computing system, in response to inactivity from the MAC address over a period of time; and
suppressing local age-out notifications for the MAC address in response to creating the age-out indication.

24. The computing system of claim 23, wherein the second notification includes a first tier message indicating initiation of the termination and a second tier message indicating the termination of specific ownership association with the computing system.

* * * * *